United States Patent
Huang (10) Patent No.: US 10,559,421 B2
(45) Date of Patent: Feb. 11, 2020

(54) STEP-UP BIPOLAR TRANSFORMER RECTIFIER WITHOUT COMMON MODE RIPPLE

(71) Applicant: The Boeing Company, Chicago, IL (US)

(72) Inventor: Jian Huang, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/016,286

(22) Filed: Jun. 22, 2018

(65) Prior Publication Data

US 2019/0392985 A1    Dec. 26, 2019

(51) Int. Cl.
| | | |
|---|---|---|
| *H01F 30/14* | (2006.01) | |
| *H01F 27/28* | (2006.01) | |
| *H02M 7/06* | (2006.01) | |
| *H02M 5/42* | (2006.01) | |

(52) U.S. Cl.
CPC ............. *H01F 30/14* (2013.01); *H01F 27/28* (2013.01); *H02M 5/42* (2013.01); *H02M 7/06* (2013.01)

(58) Field of Classification Search
CPC .......... H01F 30/14; H01F 30/12; H01F 27/28; H02M 7/06; H02M 5/42
See application file for complete search history.

(56) References Cited

U.S. PATENT DOCUMENTS

| | | | |
|---|---|---|---|
| 6,995,993 B2 * | 2/2006 | Sarlioglu | H01F 30/02 323/215 |
| 7,772,953 B2 | 8/2010 | Huang et al. | |
| 7,772,954 B2 | 8/2010 | Huang et al. | |
| 9,601,258 B2 * | 3/2017 | Huang | H01F 27/29 |
| 2015/0256099 A1 * | 9/2015 | Huang | H01F 38/00 363/64 |
| 2016/0094143 A1 * | 3/2016 | Huang | H01F 27/2823 336/170 |
| 2017/0250023 A1 * | 8/2017 | Valdivia-Guerrero | B64D 47/00 |

OTHER PUBLICATIONS

McLyman, "Transformer and Inductor Design Handbook: Third Edition, Revised and Expanded," Marcel Dekker, Inc., 2004, 533 pages.

* cited by examiner

*Primary Examiner* — Kyle J Moody
(74) *Attorney, Agent, or Firm* — Yee & Associates, P.C.

(57) ABSTRACT

A multi-phase transformer. The multi-phase transformer includes a single rectifier; and a plurality of groups of windings connected to the single rectifier. Each one of the plurality of groups of windings comprises: a corresponding plurality of primary windings having a first output voltage; a corresponding plurality of secondary windings having a second output voltage; and a corresponding plurality of tertiary windings having a third output voltage that is higher than the second output voltage.

20 Claims, 8 Drawing Sheets

STEP-UP BIPOLAR TRANSFORMER RECTIFIER WITHOUT COMMON MODE RIPPLE

BACKGROUND INFORMATION

1. Field

The present disclosure relates to step-up bipolar transformer rectifiers.

2. Background

A "transformer" is an electrical device for reducing or increasing the voltage of an alternating current. A "rectifier" is an electrical device that converts AC into DC. "Noise" in an electrical system is variations in current or voltage that are undesirable. The term "AC" means "alternating current," a form of electrical current which alternates in the direction of travel along a transmission line. The term "DC" means "direct current," a form of electrical current which flows in only one direction along a transmission line.

The term "common mode ripple" refers to a form of noise commonly encountered in electrical systems, which may also be termed "common mode noise." In particular, common mode ripple is the summation of the positive voltage and negative voltage on the rectified DC busses. Common mode noise is conducted on all electrical lines in the same direction. Common mode ripple or common mode noise is undesirable, and thus techniques are sought to reduce common mode ripple in electrical systems.

As used herein, "low voltage" and "high voltage" are terms used relative to each other. Thus, for example, the illustrative embodiments provide for a rectifier which transforms a "low voltage AC input" to a "high voltage DC output"—meaning the AC input voltage is lower than the DC output voltage.

SUMMARY

The illustrative embodiments provide for a multi-phase transformer. The multi-phase transformer includes a single rectifier; and a plurality of groups of windings connected to the single rectifier. Each one of the plurality of groups of windings comprises: a corresponding plurality of primary windings having a first output voltage; a corresponding plurality of secondary windings having a second output voltage; and a corresponding plurality of tertiary windings having a third output voltage that is higher than the second output voltage.

The illustrative embodiments also provide for an electrical system. The electrical system includes a variable frequency generator generating a three-phase alternating current voltage. The electrical system also includes a multi-phase transformer connected to the variable frequency generator, the multi-phase transformer comprising: a single rectifier; and a plurality of groups of windings connected to the single rectifier, wherein each one of the plurality of groups of windings comprises: a corresponding plurality of primary windings having a first output voltage; a corresponding plurality of secondary windings having a second output voltage; and a corresponding plurality of tertiary windings having a third output voltage that is higher than the second output voltage. The electrical system also includes an inverter connected to the multi-phase transformer, the inverter configured to convert a direct current to an alternating current or to convert an alternating current to a direct current. The electrical system also includes a three-phase alternating current load connected to the inverter.

The illustrative embodiments also provide for a multi-phase transformer. The multi-phase transformer includes a first group of windings defining a primary leg (A-B), wherein each primary winding in the first group of windings includes one or more sub primary windings coupled in series, and a junction of two sub primary windings define an interior junction (A-B & B-C), wherein each end of the primary windings is coupled to an end of another primary winding to form a delta configuration consisting of three legs (A-B-C), and a junction of two primary windings in the first group of windings define an exterior junction (A-B & B-C), and wherein each of the first group of windings is configured to receive a phase of a multi-phase input voltage at the exterior junction, and interconnect a second group of windings comprising at least six secondary windings, wherein each secondary winding has a first end and a second end, wherein each of the secondary winding is magnetically coupled to a primary winding from among the first group of windings. The multi-phase transformer also includes a number of turns associated with the secondary group of windings, the number of turns being dependent upon a predetermined ratio to yield a desired output voltage. The multi-phase transformer also includes a twenty-four pulse rectifier configured to collect output voltages from the second group of windings from each of the three legs of the first group of windings, thereby delivering a collective output voltage at the second end of the second group of windings that is higher than an output voltage at the exterior junction of the first group of windings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments provide for a three phase, low voltage AC to high voltage DC inverter. Again, "high" and "low" refer to the relative voltage between input and output, and not to a numerical voltage. Nevertheless, for reference to a non-limiting example, the illustrative embodiments have been tested with a 115 Vac input voltage and a 270 Vdc output voltage. Again, these numbers do not necessarily limit the voltage operational range of the illustrative embodiments.

The topology of the rectifier of the illustrative embodiments will generate the DC output without the common mode voltage. Therefore, the common mode inductor will be eliminated from the AC/DC conversion system. Thus, the illustrative embodiments will save weight, reduce cost, and improve reliability of a transformer-rectifier electrical system.

The illustrative embodiments described herein address two primary issues. First, the illustrative embodiments will convert the three-phase low voltage AC input (such as 115 Vac) to a high voltage DC (such as +/−270 Vdc) output. Second, the illustrative embodiments will generate the DC outputs and eliminate the common mode voltage on the DC buses. Elimination of the common mode voltage also eliminates common mode ripple, or common mode noise, thereby significantly advancing the quality of the DC current output by the transformer-rectifier of the illustrative embodiments. An aspect of the illustrative embodiments that accomplishes these goals is the transformer topology, which is described with respect to the figures.

Figure 1:
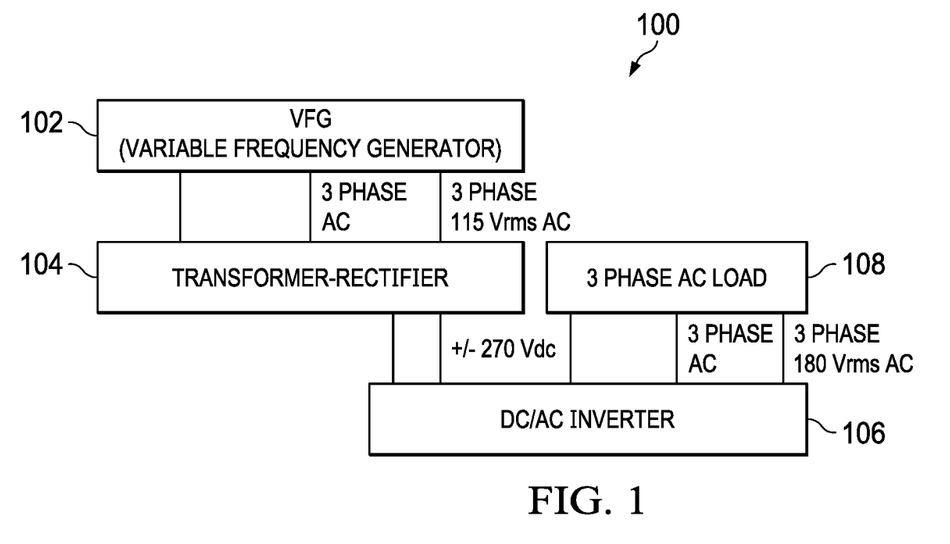
FIG. 1 illustrates a three-phase low voltage AC input to high voltage DC output, in accordance with an illustrative embodiment.

FIG. 1 illustrates a three-phase low voltage AC input to high voltage DC output, in accordance with an illustrative embodiment. Electrical system 100 includes VFG 102. "VFG" is an acronym meaning "variable frequency generator." VFG 102 is a three-phase AC power generator. Again, "AC" stands for "alternating current." In this particular illustrative embodiment, VFG 102 provides a three-phase 115 Vrms AC current as an output.

Figure 2:
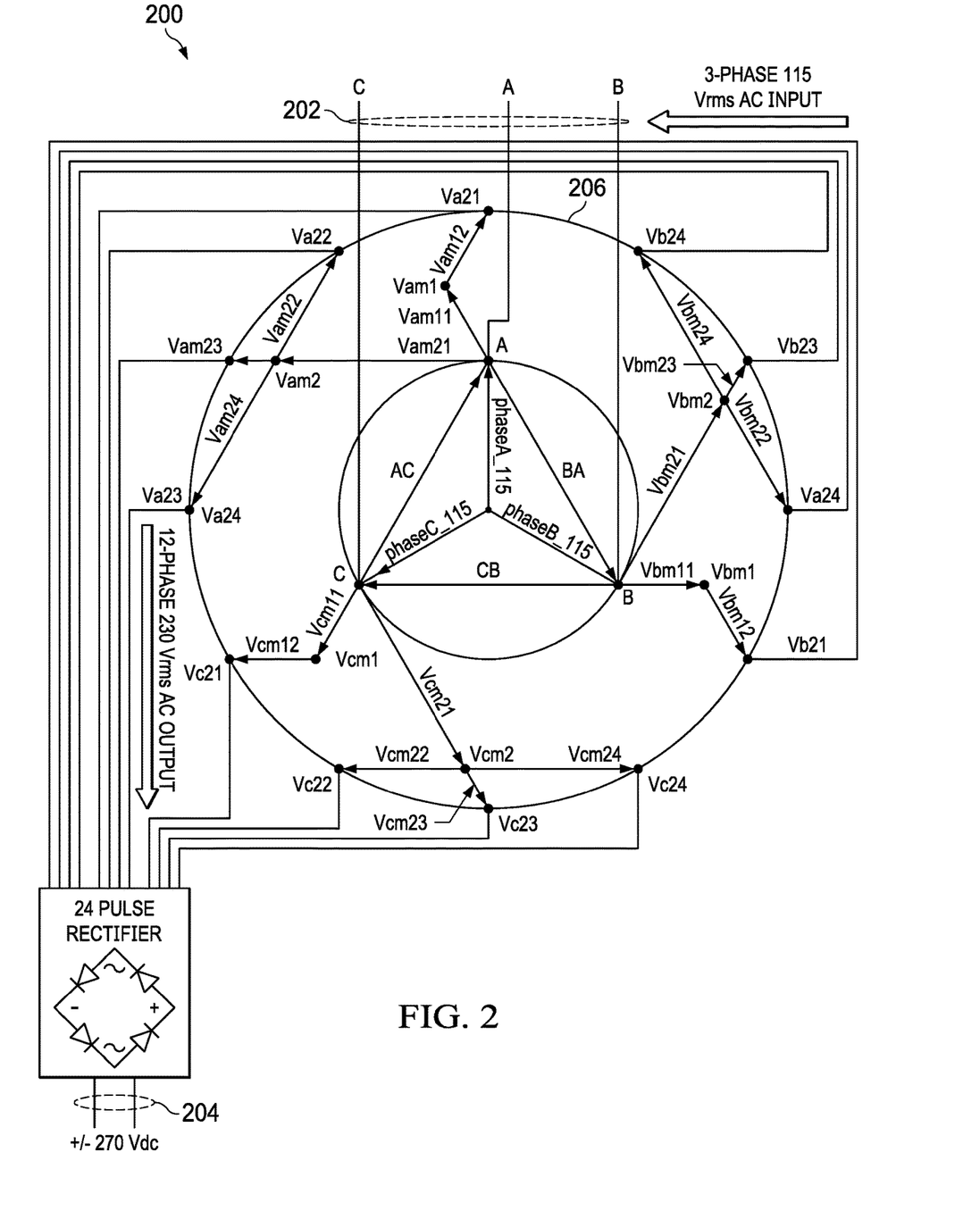
FIG. 2 illustrates a three-phase low voltage AC input to a high voltage DC output, in accordance with an illustrative embodiment.
Figure 3:
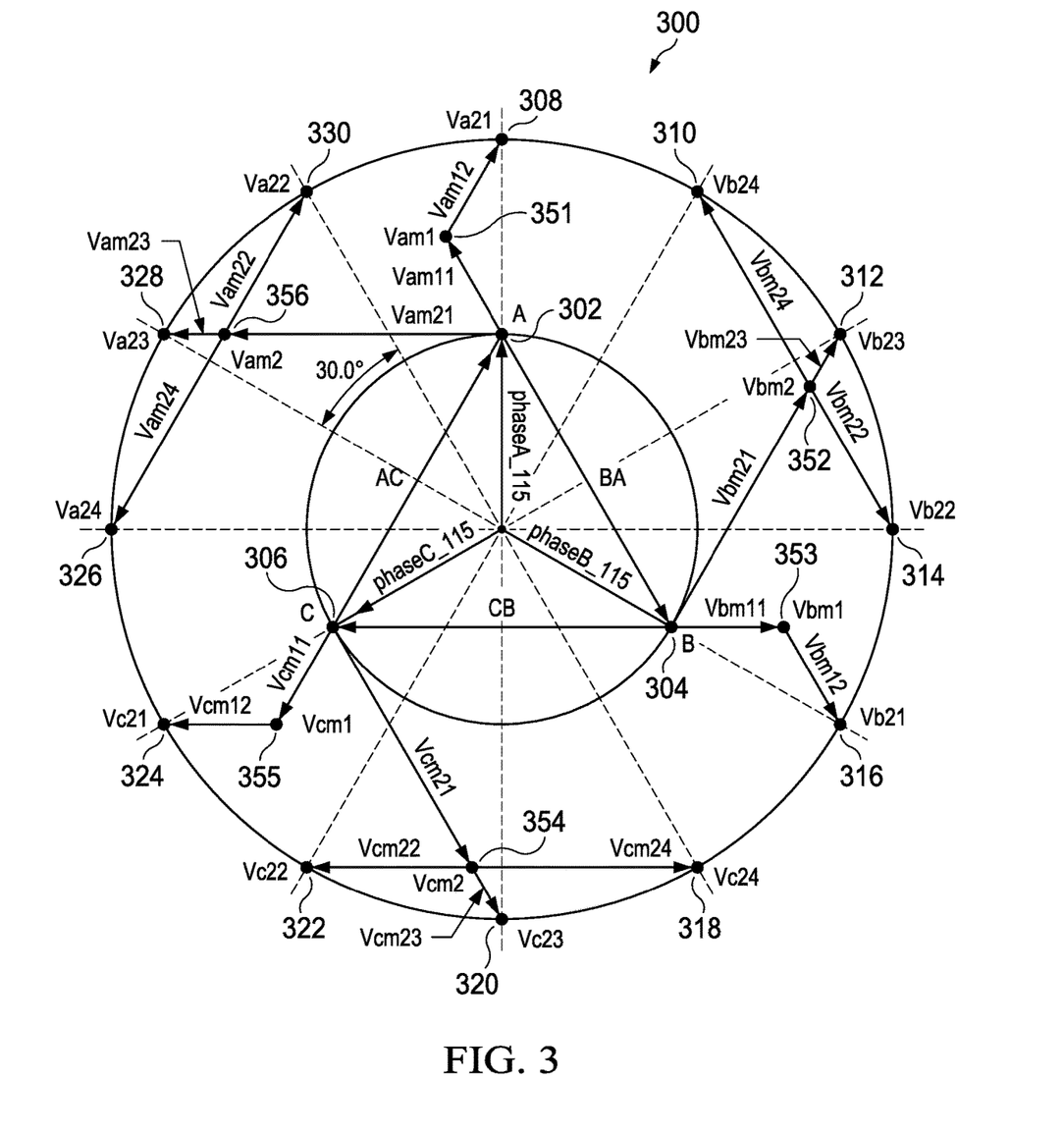
FIG. 3 illustrates a three-phase low voltage AC input to 12-phase high voltage AC output, in accordance with an illustrative embodiment.
Figure 4:
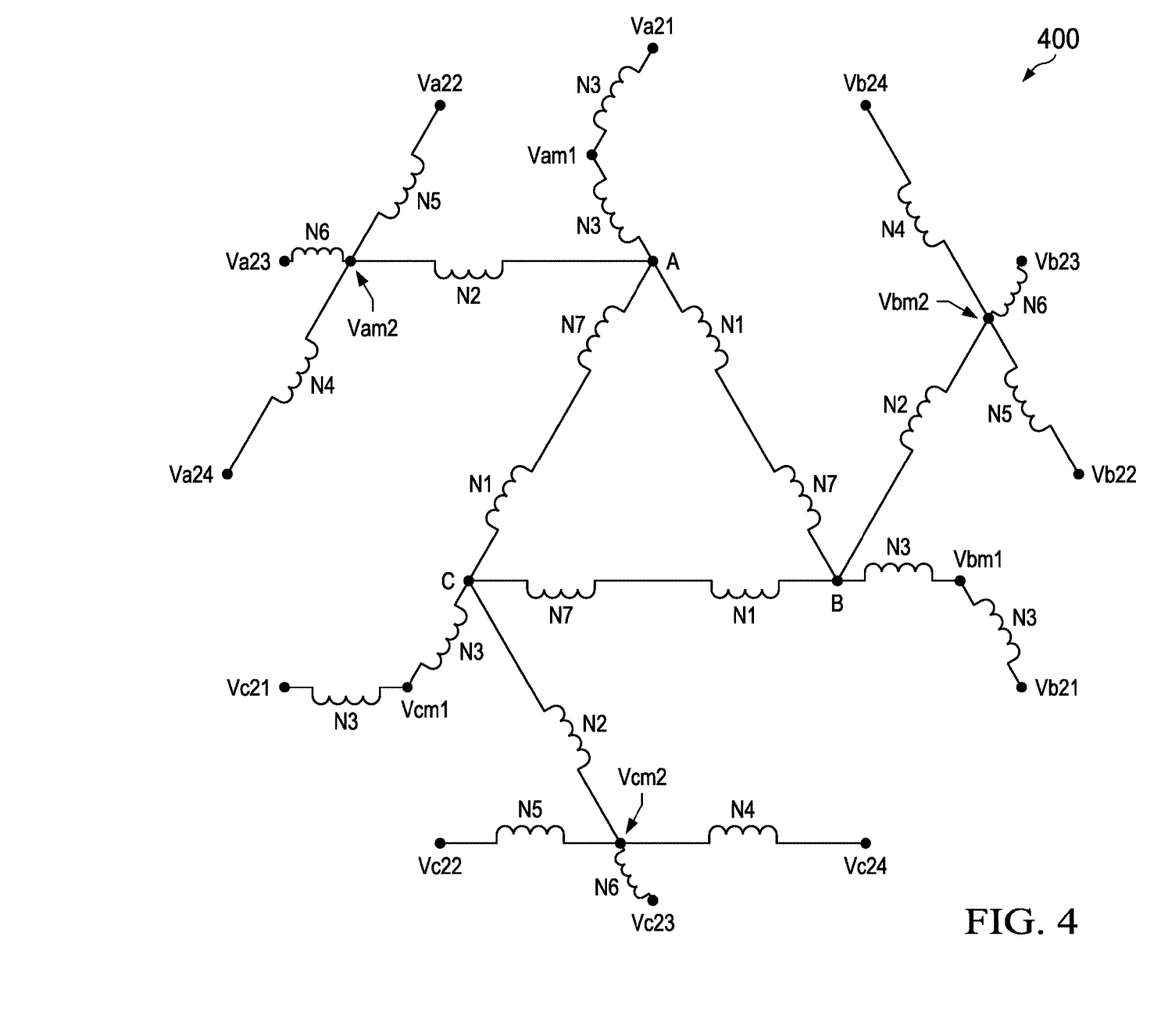
FIG. 4 illustrates a three-phase to twelve-phase transformer, in accordance with an illustrative embodiment.

Electrical system 100 also includes transformer-rectifier 104. Transformer-rectifier 104 acts as both a step up transformer (increasing the voltage relative to the input) and a rectifier (changing an AC current to DC current). Again, "DC" stands for "direct current." The design of transformer-rectifier 104 is shown in FIG. 2 through FIG. 4. In this particular non-limiting example, transformer-rectifier 104 receives the output of VFG 102 and provides plus or minus 270 Vdc as an output.

If desired, in some illustrative embodiments, the output of transformer-rectifier 104 can be provided to another rectifier, particularly DC/AC inverter 106. DC/AC inverter 106 converts the DC current from transformer-rectifier 104 back into an AC current, though now at a higher AC voltage. In this particular illustrative embodiment, DC/AC inverter 106 provides a three-phase 180 Vrms AC current to three-phase AC load 108, which is the object of interest which is to receive the power.

Thus, the function of electrical system 100 is to increase the voltage of the VFG power supply and provide increased AC voltage to a load, in this case 3-phase AC load 108. The illustrative embodiments accomplish this task without introducing a common mode, and thus without introducing common mode ripple into the load.

FIG. 2 illustrates a three-phase low voltage AC input to a high voltage DC output, in accordance with an illustrative embodiment. Transformer-rectifier 200 is an example of a design for transformer-rectifier 104 of FIG. 1. Transformer-rectifier 200 receives 3-phase AC input 202 and both transforms and rectifies this input to an increased voltage DC output 204. In this particular case, the input is 115 Vrms AC and the output is 270 Vdc; however, the design may be easily modified to accommodate any reasonable range of voltages commonly found in industry.

Voltage-phase schematic 206 shows the arrangement of voltages during each phase of the three-phase current relative to the windings of the transformer-rectifier. The details of voltage-phase schematic 206 are shown in FIG. 3.

FIG. 3 illustrates a three-phase low voltage AC input to 12-phase high voltage AC output, in accordance with an illustrative embodiment. Voltage-phase schematic 300 is voltage-phase schematic 206 of FIG. 2. The three low voltage phases described are phase A 302, phase B 304, and phase C 306. The transformer-rectifier converts the three-phase low voltage AC input to a 12-phase high voltage AC output. The twelve high voltage phases are phase 1' 308, phase 2' 310, phase 3' 312, phase 4' 314, phase 5' 316, phase 6' 318, phase 7' 320, phase 8' 322, phase 9' 324, phase 10' 326, phase 11' 328, and phase 12' 330. The conversion from the three phase AC current to twelve phase AC current is shown by the arrangement of lines and circles in FIG. 3.

All of the secondary vectors are parallel to one of the primary vectors A-B, B-C, C-A. For point A of phase A, we can see: Vector 302-351 is parallel to A-B. Vector 351-308 is parallel to C-A. Vector 302-356 is parallel to B-C. Vector 356-330 is parallel to C-A. Vector 356-326 is parallel to C-A. Vector 356-328 is parallel to B-C.

For point B of phase B, we can see: Vector 304-353 is parallel to B-C. Vector 353-316 is parallel to A-B. Vector 304-352 is parallel to C-A. Vector 352-310 is parallel to A-B. Vector 352-314 is parallel to A-B. Vector 352-312 is parallel to C-A.

For point C of phase C, we can see: Vector 306-355 is parallel to C-A. Vector 355-324 is parallel to B-C. Vector 306-354 is parallel to A-B. Vector 354-322 is parallel to B-C. Vector 354-318 is parallel to B-C. Vector 354-320 is parallel to A-B.

FIG. 4 illustrates a three-phase to twelve-phase transformer, in accordance with an illustrative embodiment. Transformer-rectifier 400 is an example of a physical arrangement of inductors which will physically implement the results of voltage-phase schematic 206 of FIG. 2 or voltage-phase schematic 300 of FIG. 3. Three inductors are arranged for each phase, labeled as "N#", or a number associated with the letter N to identify an inductor. The three phases (A, B, and C), and the twelve phases 1'-12' are shown as the outputs of the ends of the inductors.

The number of turns for each winding is determined by the relative length ratios among the vectors in FIG. 3. If lower leakage inductance between the primary and secondary windings is needed, the primary and secondary windings will be sandwiched, and the N1 and N7 inductors will be wound as two independent windings.

If leakage inductance is not an issue for the application, the N1 and N7 inductors can be combined into one single winding, as N1+N7. The total number of turns of N1+N7 is decided by the voltage, frequency, core cross section area, and how high the flux density is designed for. After deciding the total number of turns for N1+N7, the rest of turns' numbers can be calculated for all of the other windings.

The number of turns for inductor N2 can be calculated by the following way: (N1+N7) times the length_ratio (between 302-356 and B-C). The number of turns for inductor N3 can be calculated by the following way: (N1+N7) times the length_ratio (between 302-351 and A-B). The number of turns for inductor N4 can be calculated by the following way: (N1+N7) times the length_ratio (between 356-326 and A-C). The number of turns for inductor N5 can be calculated by the following way: (N1+N7) times the length_ratio (between 356-330 and A-C). The number of turns for inductor N6 can be calculated by the following way: (N1+N7) times the length_ratio (between 356-328 and B-C).

Figure 5:
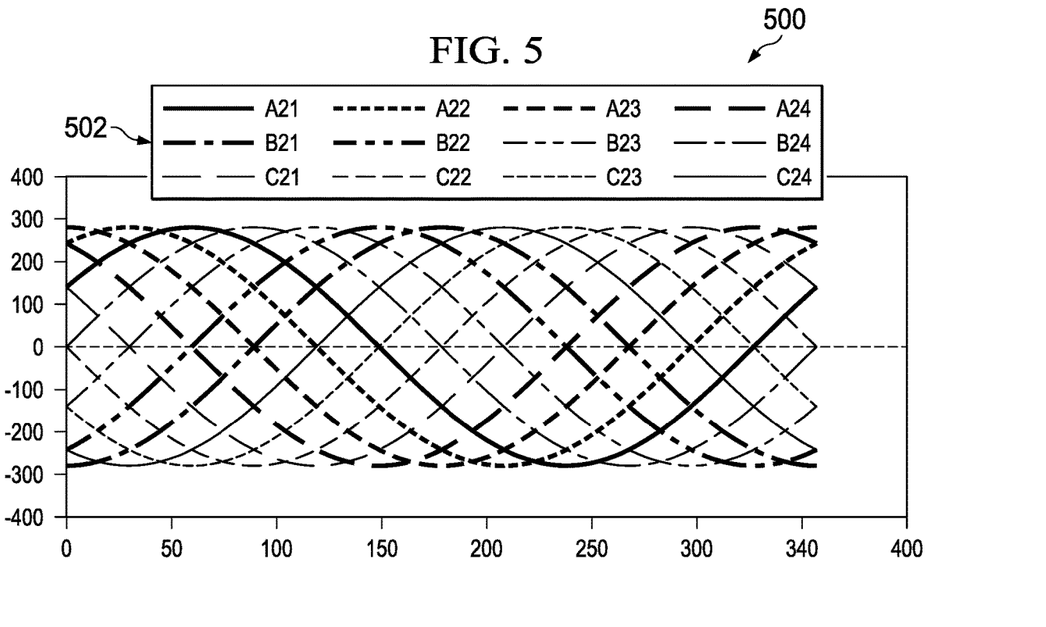
FIG. 5 illustrates a sample output of a twelve-phase transformer output, in accordance with an illustrative embodiment.

FIG. 5 illustrates a sample output of a twelve-phase transformer output, in accordance with an illustrative embodiment. Thus, output 500 may be an output of the transformer aspect of transformer-rectifier 400 of FIG. 4. Legend 502 shows the individual output of each phase of the 12-phase AC output of transformer-rectifier 400.

Figure 6:
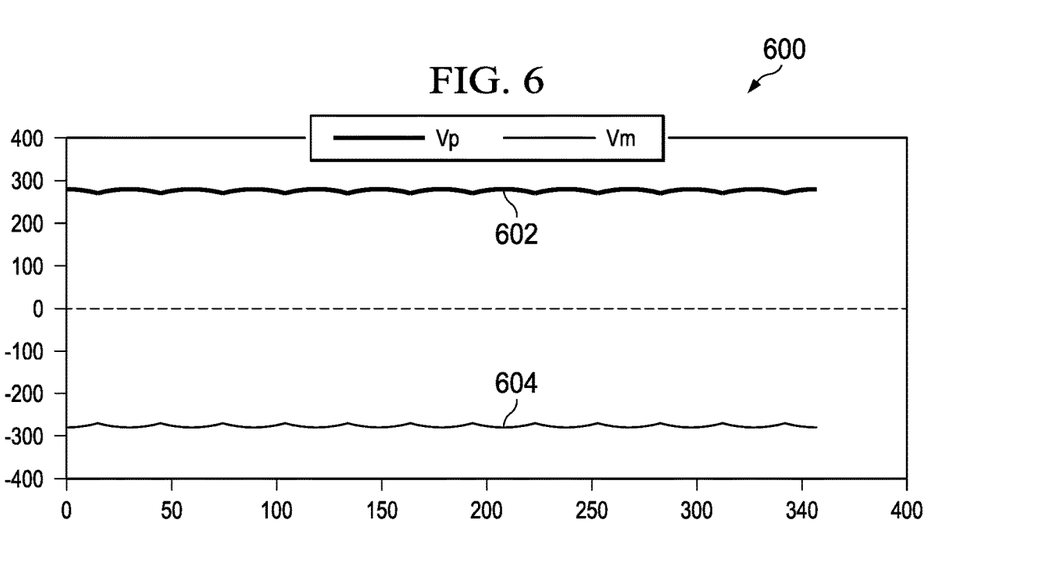
FIG. 6 illustrates a sample output of rectifier DC busses, in accordance with an illustrative embodiment.

FIG. 6 illustrates a sample output of rectifier DC busses, in accordance with an illustrative embodiment. Output 600 shows the rectified output of transformer-rectifier 400 of FIG. 4. As can be seen, Vp (positive DC bus) 602 and Vm (negative DC bus) 604 are fairly stable DC outputs without common mode ripple.

Figure 7:
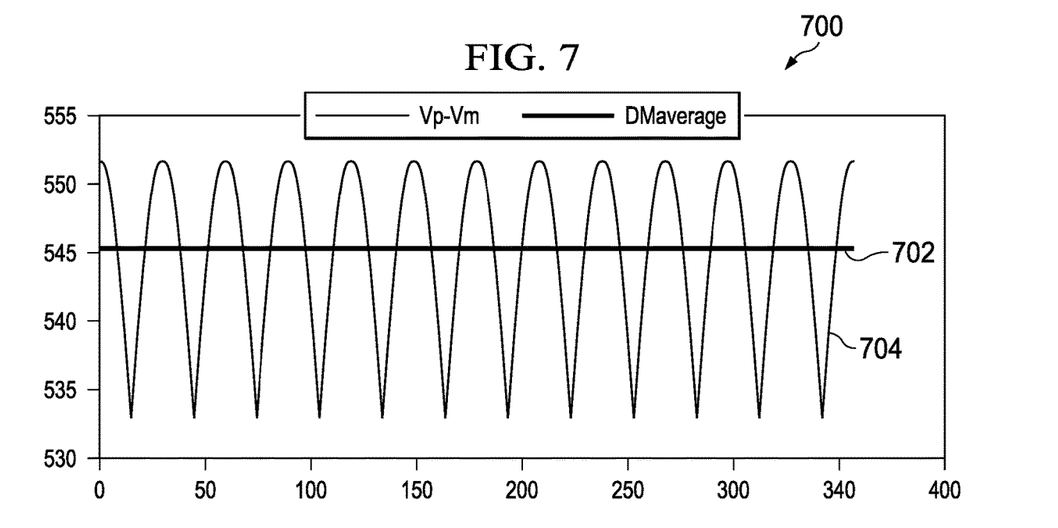
FIG. 7 illustrates a sample rectifier DC bus differential voltage and average voltage, in accordance with an illustrative embodiment.

FIG. 7 illustrates a sample rectifier DC bus differential voltage and average voltage, in accordance with an illustrative embodiment. Graph 700 shows that the difference between Vp and Vm is a consistent oscillating wave 704. The average is shown at line 702.

Figure 8:
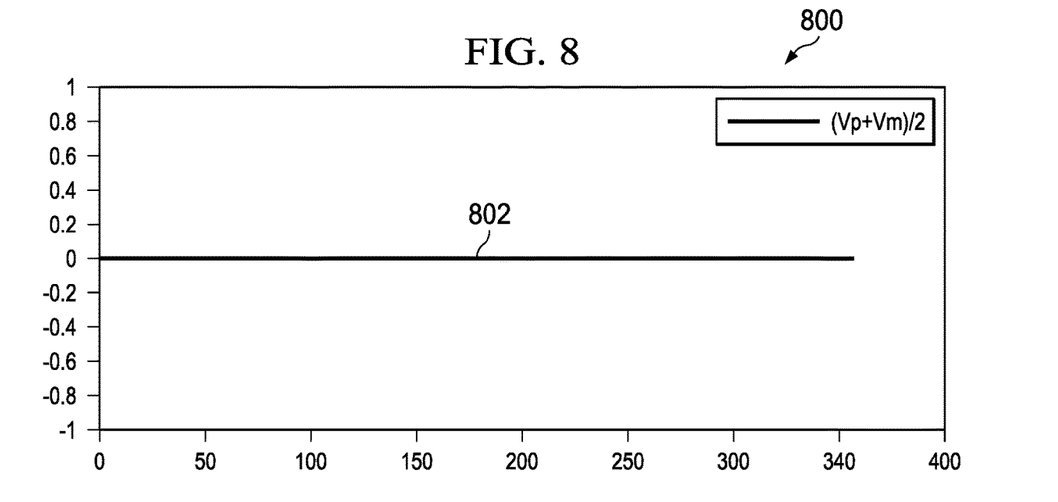
FIG. 8 illustrates a sample rectifier DC bus common mode voltage, in accordance with an illustrative embodiment.

FIG. 8 illustrates a sample rectifier DC bus common mode voltage, in accordance with an illustrative embodiment. Graph 800 shows that the common mode voltage is the average of Vp and Vm, as shown by line 802. As can be seen, the line is smooth and without common mode ripple. The transformer that has this novel feature will not need a common mode inductor to reduce the common mode voltage. Therefore, the illustrative embodiments reduce the cost and weight of an equivalent older electrical system. Additionally, the illustrative embodiments are more reliable relative to prior devices.

Figure 9:
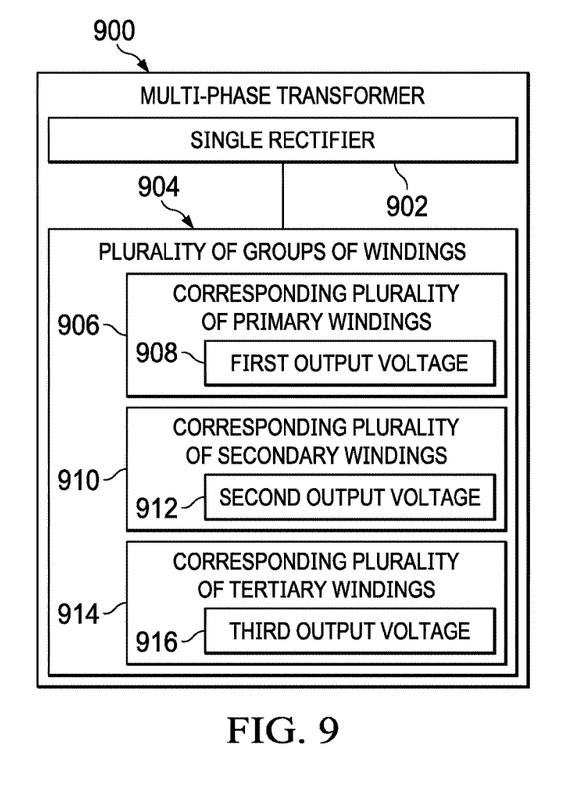
FIG. 9 illustrates a multi-phase transformer, in accordance with an illustrative embodiment.

FIG. 9 illustrates a multi-phase transformer, in accordance with an illustrative embodiment. Multi-phase transformer 900 is a variation of the transformer-rectifiers described above with respect to FIG. 1 through FIG. 4.

Multi-phase transformer 900 includes single rectifier 902. Multi-phase transformer 900 also includes plurality of groups of windings 904 connected to the single rectifier. Each one of the plurality of groups of windings comprises: a corresponding plurality of primary windings 906 having a first output voltage 908; a corresponding plurality of secondary windings 910 having a second output voltage 912; and a corresponding plurality of tertiary windings 914 having a third output voltage 916 that is higher than the second output voltage.

Multi-phase transformer 900 may be varied. In an illustrative embodiment, the plurality of groups of windings 904 has a minimum length and a minimum number of windings necessary to accomplish a desired step-up voltage of the multi-phase transformer 900. This embodiment saves on the weight of the transformer-rectifier, which is an advantage in manufacturing of some objects. The illustrative embodiments specifically contemplate use of multi-phase transformer 900, or any transformer-rectifier described herein, in aircraft. In aircraft, weight savings is important in order to reduce fuel consumption—a major contributor to the expense of operating an aircraft.

In another illustrative embodiment, each of the corresponding plurality of primary windings 906 is configured to receive a phase of a multi-phase input voltage. In this case, the phase of the multi-phase input voltage may be received at corresponding junctions of two sub-windings for each of the corresponding plurality of primary windings.

In another illustrative embodiment, the corresponding plurality of secondary windings 910 comprises at least six windings having first ends and second ends. In this case, each of the at least six windings is magnetically coupled to a given one of the corresponding plurality of primary windings.

In another illustrative embodiment, the corresponding plurality of secondary windings 910 has a number of turns dependent upon a predetermined ratio to yield a desired output voltage. In still another illustrative embodiment, the single rectifier 902 comprises a twenty-four pulse rectifier. In this case, the twenty-four pulse rectifier collects output voltages from the corresponding plurality of primary windings 906 and the corresponding plurality of secondary windings 910.

Note that multi-phase transformer 900 does not include a common mode inductor. Thus, the illustrative embodiments completely avoid the problem of common mode ripple or common mode noise.

Still other variations are possible. Thus, the illustrative embodiments are not necessarily limited to the example provided for FIG. 9.

Figure 10:
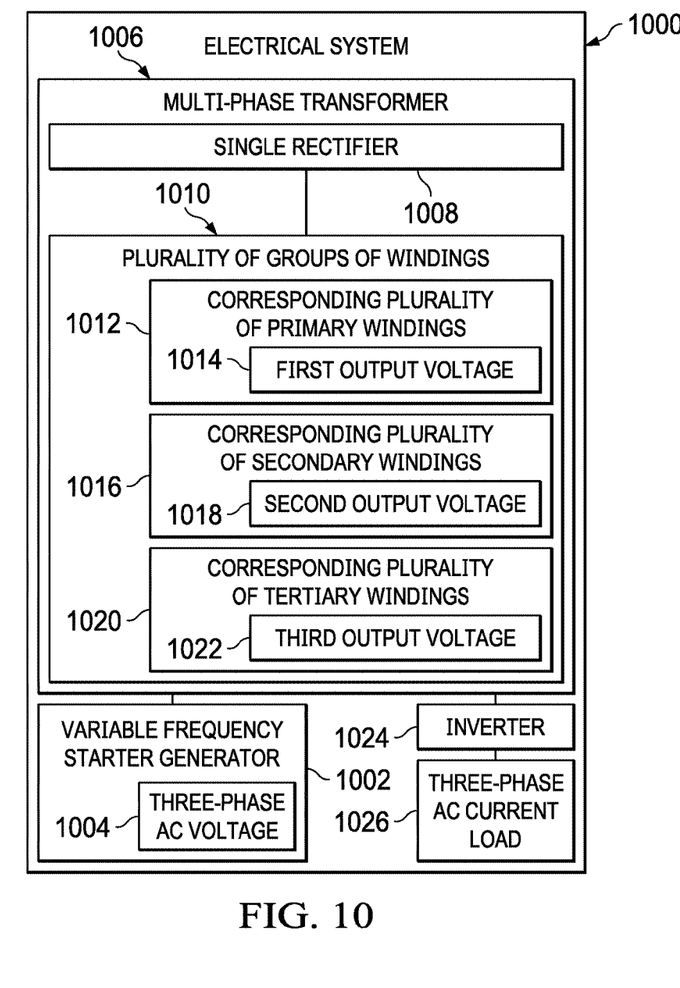
FIG. 10 illustrates an electrical system, in accordance with an illustrative embodiment.

FIG. 10 illustrates an electrical system, in accordance with an illustrative embodiment. Electrical system 1000 is a variation of electrical system 100 of FIG. 1.

Electrical system 1000 includes a variable frequency generator 1002 generating a three-phase alternating current voltage 1004. The electrical system 1000 also includes a multi-phase transformer 1006 connected to the variable frequency generator 1002. The multi-phase transformer 1006 includes: a single rectifier 1008; and a plurality of groups of windings 1010 connected to the single rectifier 1008, wherein each one of the plurality of groups of windings 1010 comprises: a corresponding plurality of primary windings 1012 having a first output voltage 1014; a corresponding plurality of secondary windings 1016 having a second output voltage 1018; and a corresponding plurality of tertiary windings 1020 having a third output voltage 1022 that is higher than the second output voltage 1018.

The electrical system 1000 also includes an inverter 1024 connected to the multi-phase transformer 1006, the inverter 1024 configured to convert a direct current to an alternating current or to convert an alternating current to a direct current. The electrical system 1000 also includes a three-phase alternating current load 1026 connected to the inverter 1024.

Electrical system 1000 may be varied. For example, the plurality of groups of windings 1010 may have a minimum length and a minimum number of windings necessary to accomplish a desired step-up voltage of the electrical system. In another illustrative embodiment, each of the corresponding plurality of primary windings 1012 is configured to receive a phase of a multi-phase input voltage. In this case, the phase of the multi-phase input voltage is received at corresponding junctions of two sub-windings for each of the corresponding plurality of primary windings.

In another illustrative embodiment, the corresponding plurality of secondary windings comprises at least six windings having first ends and second ends. In this case, each of the at least six windings is magnetically coupled to a given one of the corresponding plurality of primary windings.

In still another illustrative embodiment, the corresponding plurality of secondary windings 1016 has a number of turns dependent upon a predetermined ratio to yield a desired output voltage. In yet another illustrative embodiment, the rectifier comprises a twenty-four pulse rectifier. In this case, the twenty-four pulse rectifier collects output voltages from the corresponding plurality of primary windings and the corresponding plurality of secondary windings.

Still other variations are possible. Thus, the illustrative embodiments are not necessarily limited to the example provided for FIG. 10.

Figure 11:
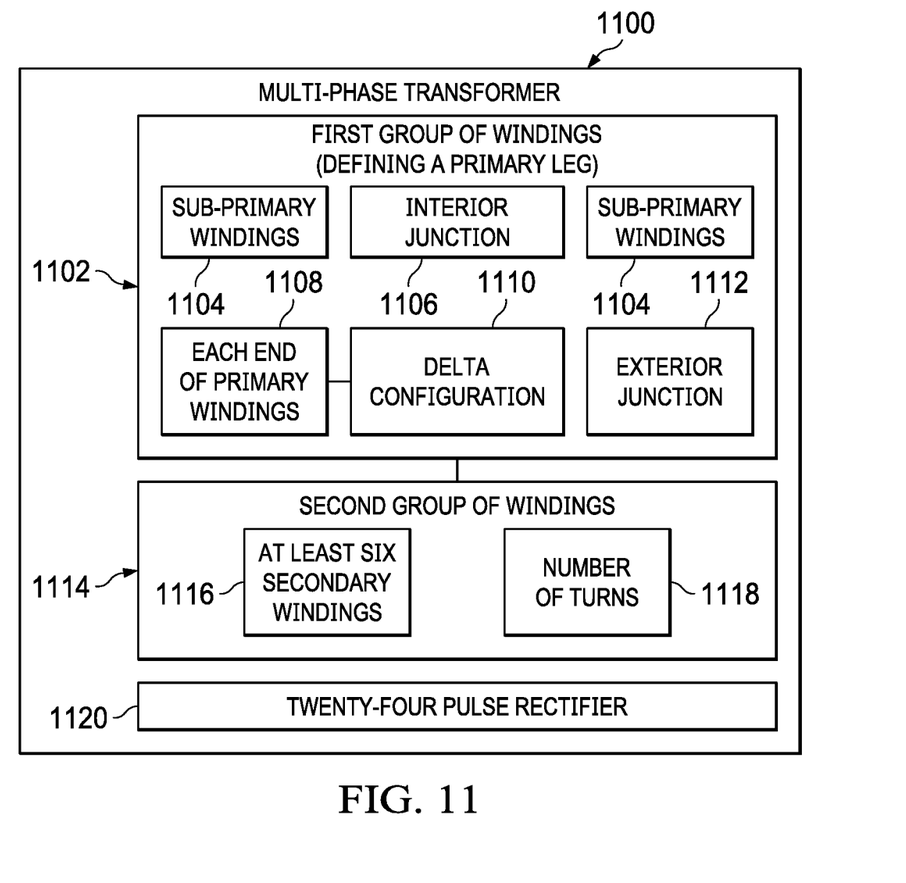
FIG. 11 illustrates a multi-phase transformer, in accordance with an illustrative embodiment.

FIG. 11 illustrates a multi-phase transformer, in accordance with an illustrative embodiment. Multi-phase transformer 1100 is a variation of multi-phase transformer 900 of FIG. 9 or of the transformer-rectifiers described with respect to FIG. 1 through FIG. 4.

Multi-phase transformer 1100 includes a first group of windings 1102 defining a primary leg (A-B). Each primary winding includes one or more sub primary windings 1104 coupled in series, and a junction of two sub primary windings (two instances of sub-primary windings 1104) define an interior junction 1106 (A-B & B-C). Each end of the primary windings 1108 is coupled to an end of another primary winding to form a delta configuration 1110 consisting of three legs (A-B-C), and a junction of two primary windings define an exterior junction 1112 (A-B & B-C). Each of the plurality of primary windings is configured to receive a phase of a multi-phase input voltage at the exterior junction 1112, and interconnect a second group of windings 1114 comprising at least six secondary windings 1116. Each secondary winding has a first end and a second end. Each of the secondary windings in the second group of windings 1114 is magnetically coupled to a primary winding from among the plurality of primary windings in the first group of windings 1102. The multi-phase transformer 1100 also includes a number of turns 1118 associated with the secondary group of windings 1114, the number of turns 1118 being dependent upon a predetermined ratio to yield a desired output voltage. The multi-phase transformer 1100 also includes a twenty-four pulse rectifier 1120 configured to collect output voltages from the second group of windings 1114 from each of the three legs of first group of windings 1102, thereby delivering a collective output voltage at a second end of the second group windings 1114 that is higher than an output voltage at the exterior junction 1112 of the first group of windings 1102.

Still other variations are possible. Thus, the illustrative embodiments are not necessarily limited to the example provided for FIG. 11.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A multi-phase transformer comprising:
    a single rectifier; and
    a plurality of groups of windings connected to the single rectifier, wherein each one of the groups of windings comprises:
        a corresponding plurality of primary windings having a first output voltage;
        a corresponding plurality of secondary windings joined in series to the corresponding plurality of primary windings and having a second output voltage; and
        a corresponding plurality of tertiary windings joined in series to the corresponding plurality of secondary windings and having a third output voltage that is higher than the second output voltage;
    wherein each end of a primary winding of the corresponding plurality of primary windings is coupled to an end of another primary winding to form a delta configuration and a junction at each coupling that interconnects at least one secondary winding of the corresponding plurality of secondary windings.

2. The multi-phase transformer of claim 1, wherein the plurality of groups of windings has a minimum length and a minimum number of windings necessary to accomplish a desired step-up voltage of the multi-phase transformer.

3. The multi-phase transformer of claim 1, wherein each of the primary windings is configured to receive a phase of a multi-phase input voltage.

4. The multi-phase transformer of claim 3, wherein the phase of the multi-phase input voltage is received at a corresponding junction of two secondary windings for each of the primary windings.

5. The multi-phase transformer of claim 1, wherein the corresponding plurality of secondary windings comprises at least six windings having first ends and second ends.

6. The multi-phase transformer of claim 5, wherein each of the at least six windings is magnetically coupled to a given one of the corresponding plurality of primary windings.

7. The multi-phase transformer of claim 1, wherein the corresponding plurality of secondary windings has a number of turns dependent upon a predetermined ratio to yield a desired output voltage.

8. The multi-phase transformer of claim 1, wherein the single rectifier comprises a twenty-four pulse rectifier.

9. The multi-phase transformer of claim 8, wherein the twenty-four pulse rectifier collects output voltages from the corresponding plurality of primary windings and the corresponding plurality of secondary windings.

10. The multi-phase transformer of claim 1, wherein the multi-phase transformer does not include a common mode inductor.

11. An electrical system comprising:
    a variable frequency generator generating a three-phase alternating current voltage;
    a multi-phase transformer connected to the variable frequency generator, the multi-phase transformer comprising:
        a single rectifier; and
        a plurality of groups of windings connected to the single rectifier, wherein each one of the groups of windings comprises:
            a corresponding plurality of primary windings having a first output voltage;
            a corresponding plurality of secondary windings coupled in series to the corresponding plurality of primary windings and having a second output voltage; and
            a corresponding plurality of tertiary windings coupled in series to the corresponding plurality of secondary windings and having a third output voltage that is higher than the second output voltage;

wherein each end of a primary winding is coupled to an end of another primary winding to form a plurality of couplings in a delta configuration where each coupling of the plurality of couplings interconnects at least one secondary winding;

an inverter connected to the multi-phase transformer, the inverter configured to convert a direct current to an alternating current or to convert an alternating current to a direct current; and a three-phase alternating current load connected to the inverter.

12. The electrical system of claim 11, wherein the plurality of groups of windings has a minimum length and a minimum number of windings necessary to accomplish a desired step-up voltage of the electrical system.

13. The electrical system of claim 11, wherein each of the primary windings is configured to receive a phase of a multi-phase input voltage.

14. The electrical system of claim 13, wherein the phase of the multi-phase input voltage is received at a corresponding junction of two secondary windings for each of the primary windings.

15. The electrical system of claim 11, wherein the corresponding plurality of secondary windings comprises at least six windings having first ends and second ends.

16. The electrical system of claim 15, wherein each of the at least six windings is magnetically coupled to a given one of the corresponding plurality of primary windings.

17. The electrical system of claim 11, wherein the corresponding plurality of secondary windings has a number of turns dependent upon a predetermined ratio to yield a desired output voltage.

18. The electrical system of claim 11, wherein the rectifier comprises a twenty-four pulse rectifier.

19. The electrical system of claim 18, wherein the twenty-four pulse rectifier collects output voltages from the corresponding plurality of primary windings and the corresponding plurality of secondary windings.

20. A multi-phase transformer comprising:

a first group of windings defining a primary leg (A-B), wherein each primary winding in the first group of windings includes one or more sub primary windings coupled in series, and a junction of two sub primary windings define an interior junction (A-B & B-C), wherein each end of the primary windings is coupled to an end of another primary winding to form a delta configuration consisting of three legs (A-B-C), and a junction of two primary windings in the first group of windings define an exterior junction (A-B & B-C), and wherein each of the first group of windings is configured to receive a phase of a multi-phase input voltage at the exterior junction, and interconnect a second group of windings comprising at least six secondary windings, wherein each secondary winding has a first end and a second end, wherein each of the secondary windings is magnetically coupled to a primary winding from among the first group of windings;

a number of turns associated with the second group of windings, the number of turns being dependent upon a predetermined ratio to yield a desired output voltage; and a twenty-four pulse rectifier configured to collect output voltages from the second group of windings from each of the three legs of the first group of windings, thereby delivering a collective output voltage at the second end of the second group of windings that is higher than an output voltage at the exterior junction of the first group of windings.

* * * * *